United States Patent
Becher et al.

(10) Patent No.: US 11,338,331 B2
(45) Date of Patent: May 24, 2022

(54) SORTING INSTALLATION AND METHOD FOR THE SORTING OF OBJECTS

(71) Applicants: SIEMENS AKTIENGESELLSCHAFT, Munich (DE); DEUTSCHE POST AG, Bonn (DE)

(72) Inventors: Joern Becher, Mainz (DE); Bernd Hartmann, Grafschaft-Leimersdorf (DE); Reinhard Klink, Stockach (DE)

(73) Assignees: Siemens Aktiengesellschaft AG, Munich (DE); Deutsche Post AG, Bonn (DE)

( * ) Notice: Subject to any disclaimer, the term of this patent is extended or adjusted under 35 U.S.C. 154(b) by 87 days.

(21) Appl. No.: 16/573,228

(22) Filed: Sep. 17, 2019

(65) Prior Publication Data
US 2020/0086354 A1 Mar. 19, 2020

(30) Foreign Application Priority Data

Sep. 17, 2018 (EP) .................................... 18194907

(51) Int. Cl.
*B07C 5/38* (2006.01)

(52) U.S. Cl.
CPC .................................... *B07C 5/38* (2013.01)

(58) Field of Classification Search
CPC .. B07C 5/38; B07C 5/36; B07C 5/362; B07C 3/08; B07C 3/02; B07C 3/00
See application file for complete search history.

(56) References Cited

U.S. PATENT DOCUMENTS

| 2,535,715 A | 12/1950 | Anderson |
| 4,804,078 A * | 2/1989 | Scata' ................ B65G 47/646 198/346.2 |
| 6,005,211 A | 12/1999 | Huang et al. |
| 6,095,314 A * | 8/2000 | Fortenbery ............ B65G 47/71 198/360 |
| 6,227,377 B1 * | 5/2001 | Bonnet .................. B65G 21/12 198/435 |

(Continued)

FOREIGN PATENT DOCUMENTS

| CN | 105008254 A | 10/2015 |
| CN | 206483709 U | 9/2017 |

(Continued)

*Primary Examiner* — Patrick H Mackey
(74) *Attorney, Agent, or Firm* — Laurence A. Greenberg; Werner H. Stemer; Ralph E. Locher

(57) ABSTRACT

A sorting installation sorts objects and contains a sorter for conveying objects and also an end station facility accepting objects. The sorter is configured to bring at least a few of the objects conveyed on the sorter in an object introduction direction, which is different from a local direction of object conveyance of the sorter in an area of the sorter adjoining the end station facility, into the end station facility. In order to make possible a fine distribution of the objects that is favorable in terms of the effort involved, the end station facility has a first object store, a second object store and also a transport facility. The transport facility is configured to transport the objects brought by the sorter into the end station facility optionally along a first transport path to the first object store or along a second transport path to the second object store.

17 Claims, 12 Drawing Sheets

(56) References Cited

U.S. PATENT DOCUMENTS

| | | | | |
|---|---|---|---|---|
| 6,499,582 B1* | 12/2002 | Gillott | ............... | B65G 47/647 |
| | | | | 193/31 R |
| 6,715,599 B1* | 4/2004 | Fortenbery | ............ | B65G 47/44 |
| | | | | 198/360 |
| 8,919,529 B1* | 12/2014 | Erceg | ............... | B65G 47/962 |
| | | | | 198/360 |
| 9,517,492 B2* | 12/2016 | Schwarzbauer | ....... | B65G 37/00 |
| 10,556,253 B2* | 2/2020 | Khan | .................... | B65G 47/64 |
| 2017/0362039 A1* | 12/2017 | Eisenberg | .............. | B65G 47/46 |
| 2020/0017312 A1* | 1/2020 | Becher | ................... | B65G 21/12 |

FOREIGN PATENT DOCUMENTS

| | | |
|---|---|---|
| CN | 207430716 U | 6/2018 |
| DE | 102016015061.0 | 6/2018 |
| WO | WO 9912834 A1 | 3/1999 |

* cited by examiner

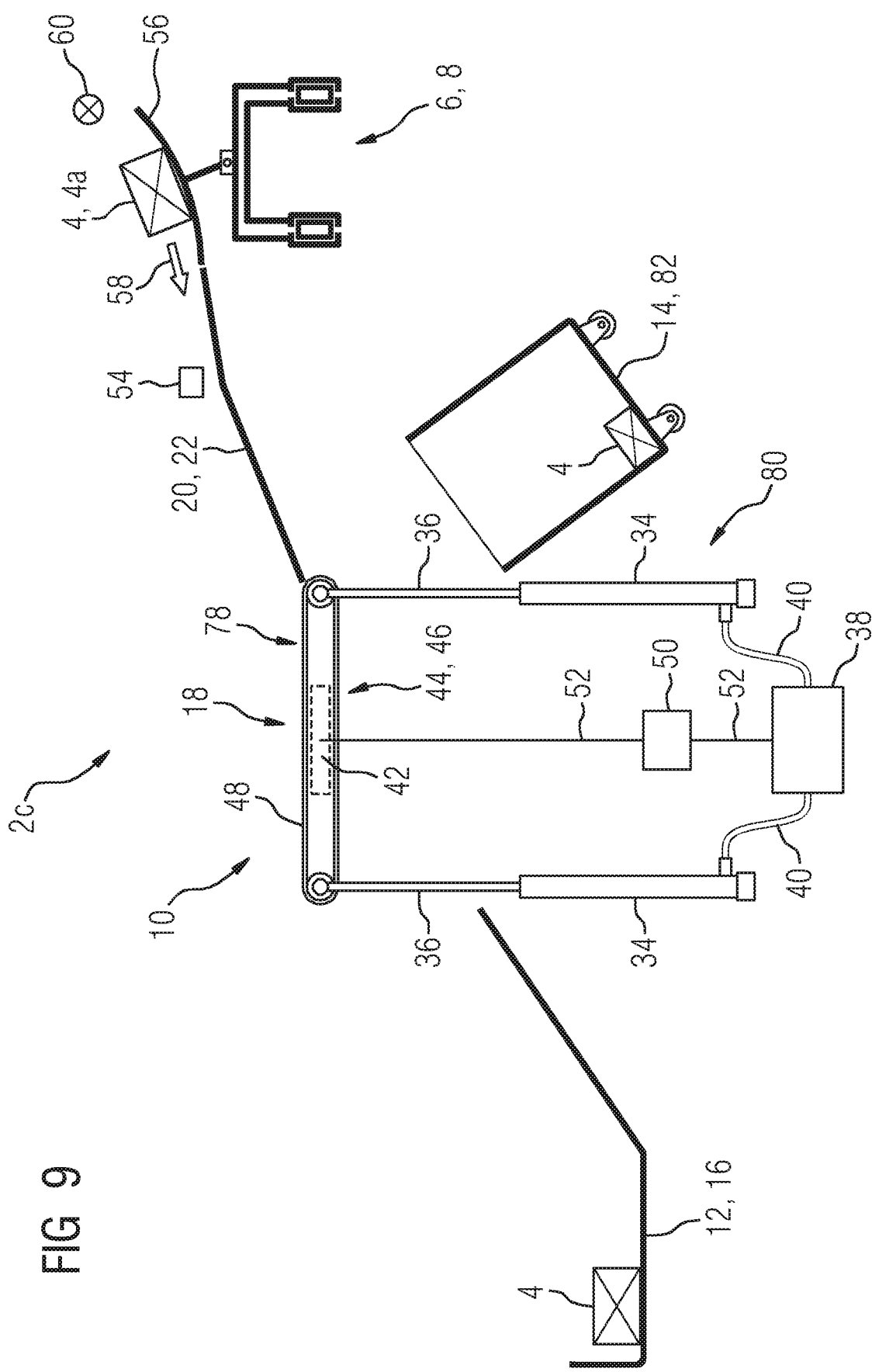

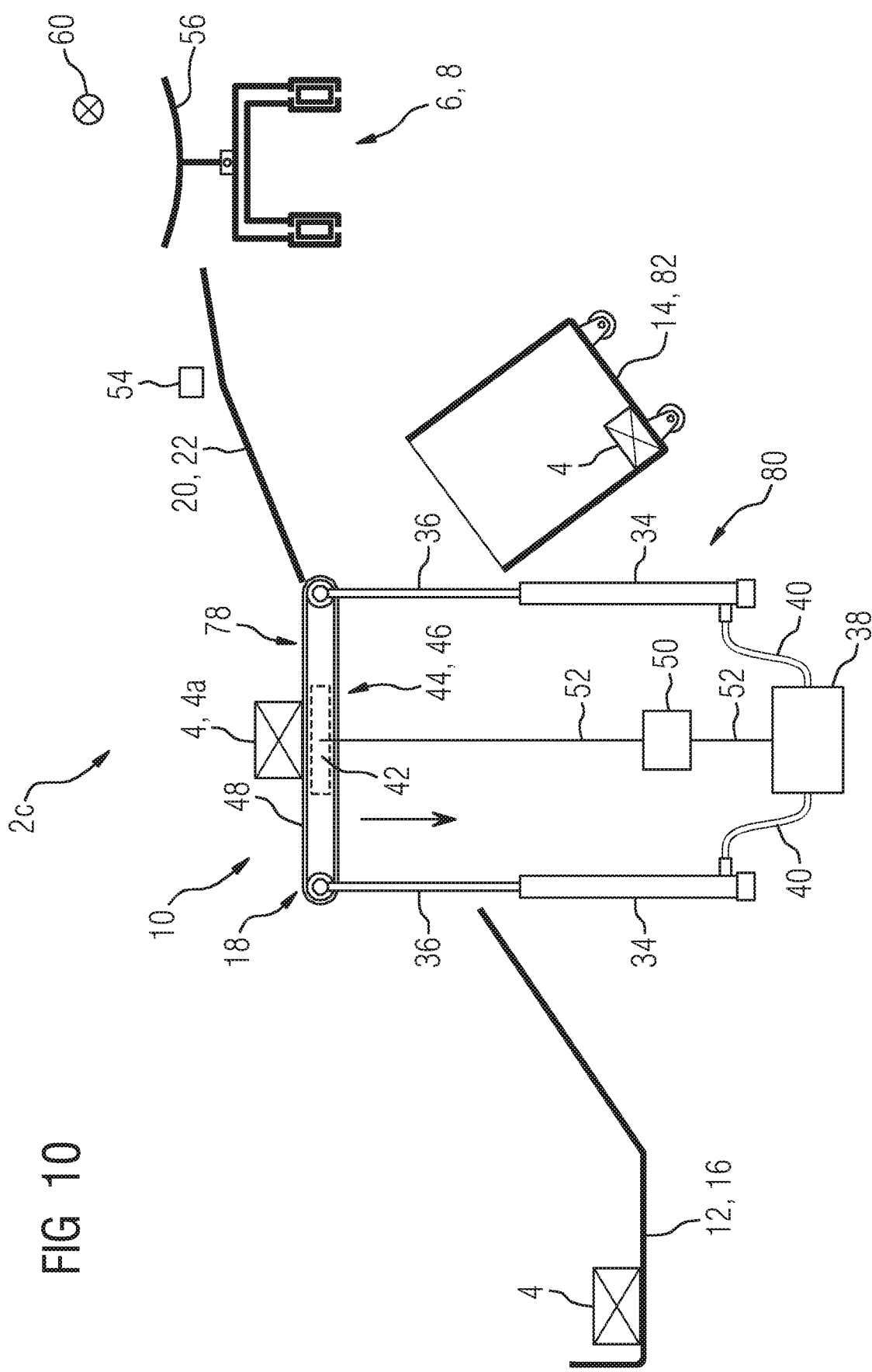

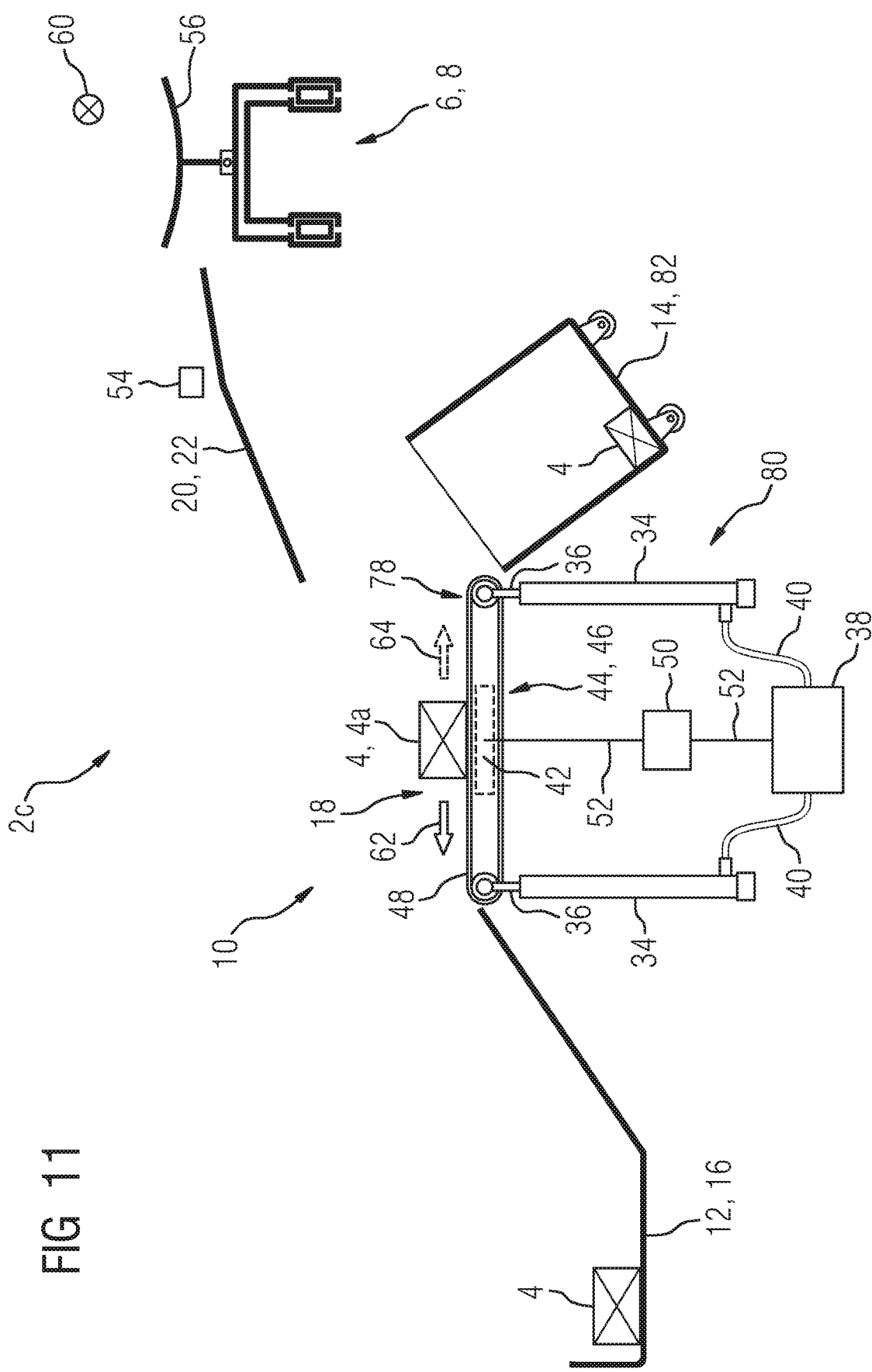

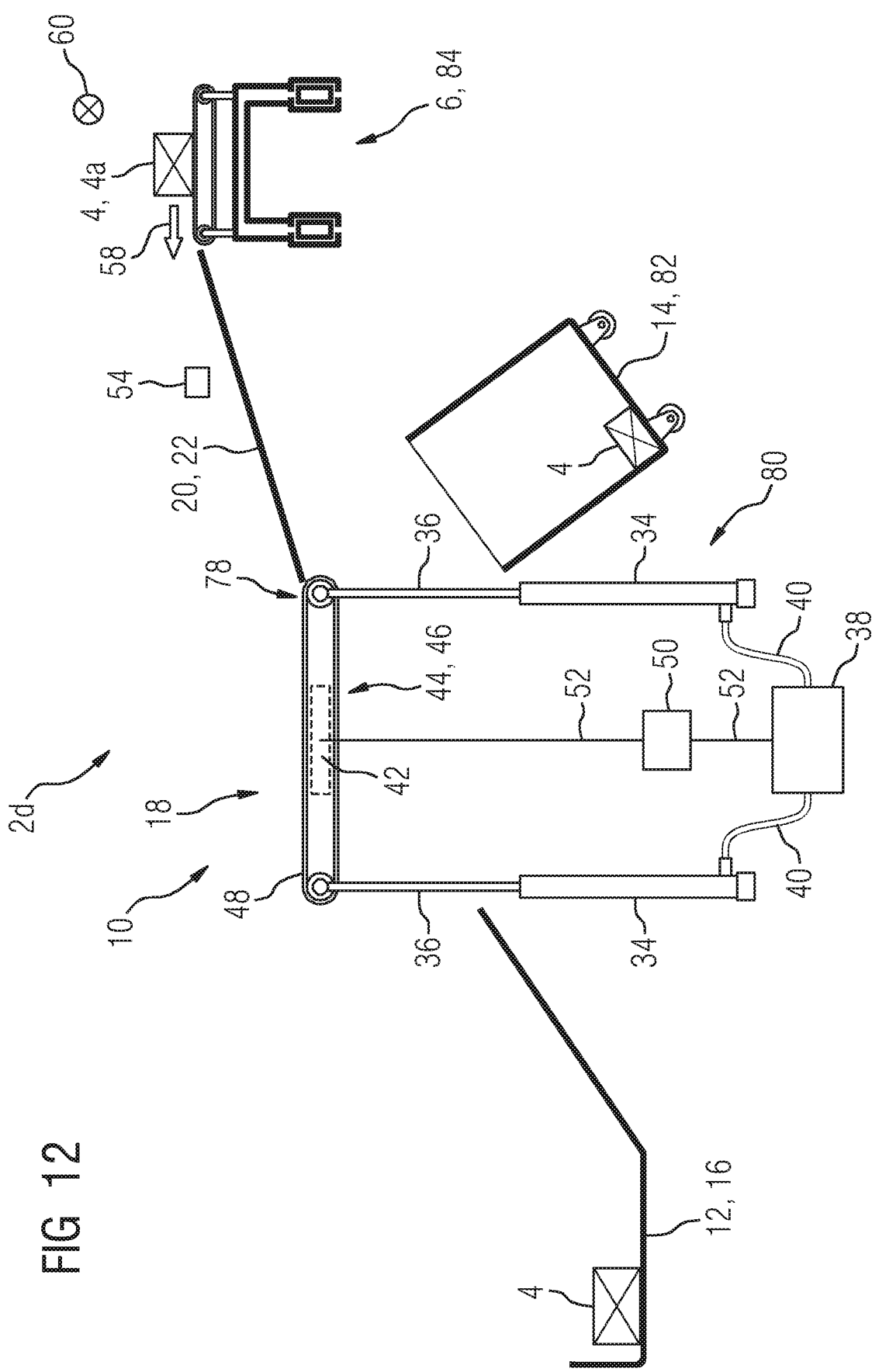

SORTING INSTALLATION AND METHOD FOR THE SORTING OF OBJECTS

CROSS-REFERENCE TO RELATED APPLICATION

This application claims the priority, under 35 U.S.C. § 119, of European application EP 18 194 907.4, filed Sep. 17, 2018; the prior application is herewith incorporated by reference in its entirety.

BACKGROUND OF THE INVENTION

Field of the Invention

The invention relates to a sorting installation for the sorting of objects and to a method for the sorting of objects in a sorting installation.

Sorting installations, as are present in parcel handling and dispatch systems for example, usually contain one or more sorters and also a number of end station facilities. In the end station facilities of a sorting installation the objects distributed by a sorter to the end stations are stored until the next processing step, such as for example the loading of objects into rolling containers for their further transport.

Objects that are stored temporarily in the same end station facility are typically intended for the same destination (region), such as for example for a predetermined parcel handling/dispatch centre or for a predetermined distribution region. The objects can basically be distributed to the end station facilities in accordance with any given criterion other than their respective destination (region). Within an end station facility the objects are usually distributed chaotically. In the respective end station facility there is thus in particular no fine distribution of the objects in accordance with further criteria (such as for example the destination addresses and/or the dimensions of the objects).

As a result of ever-increasing volumes of objects that are to be processed by sorting installations, there is basically an increasing need for distributing the objects in a more refined way in a sorting installation, in particular for allocating the objects, other than according to their destination (region), also according to at least one further criterion. One approach to enabling a fine distribution of objects in a sorting installation makes provision for installing additional end station facilities in the sorting installation, so that the objects can be distributed to a greater number of end station facilities.

The number of end station facilities of a sorting installation able to be realized depends inter alia on the space available as well as on the length of the respective sorter. Mostly the number of realizable end station facilities is already exhausted, so that the installation of additional end station facilities for a fine distribution of the objects is not possible.

SUMMARY OF THE INVENTION

An object of the invention, in a sorting installation for the sorting of objects, is to make possible a fine distribution of the objects in a favorable manner as regards outlay.

This object is achieved in accordance with the invention by a sorting installation according to the independent sorting installation claim as well as by a method according to the independent method claim.

Preferred embodiments of the invention are specified in the further claims as well as in the description given below.

The inventive sorting installation for the sorting of objects contains a sorter for conveying objects and also an end station facility for accepting objects. The sorter is configured to bring at least a few of the objects conveyed on the sorter in a direction in which the objects are introduced, which is different from a local direction of object conveyance of the sorter, into the end station facility in an area of the sorter adjoining the end station facility. In accordance with the invention the end station facility has a first object store, a second object store and also a transport facility, wherein the transport facility is configured to transport the objects brought by the sorter into the end station facility in each case optionally along a first transport path to the first object store or along a second transport path to the second object store.

The invention makes possible a fine distribution of objects within the end station facility, since the objects can be distributed with the aid of the transport facility to both object stores. This in particular enables a fine distribution of the objects in accordance with a predetermined criterion to be realized, without an additional end station facility being required in order to do this.

Moreover a greater storage capacity of the end station facility can be achieved by the two object stores of the end station facility—compared to a conventional end station facility having a single object store—should the two object stores of the end station facility together have a greater storage volume than the single object store of a conventional end station facility.

In the sense of the present invention "objects" involve items that can be sorted, which are to be brought from one location to another location (a destination location). Inter alia this can involve items to be sent. In particular the objects to be sorted in the sorting installation can be items sent by mail, such as consignments, parcels, small packages, letters or the like.

The sorter of the sorting installation can have a number of changes of direction. In this case the direction of object conveyance of the sorter, in which the objects are conveyed on the sorter, can be dependent on position. This means that at a first point of the sorter its local direction of object conveyance can be oriented differently than at a second point of the sorter.

Advantageously the sorter is arranged above the first and the second object stores. In other words the sorter is advantageously located higher than the two object stores. This means that it is possible in particular to transport objects from the sorter to the respective object stores under the influence of gravity.

Furthermore one of the two object stores can be placed at least partly below the sorter. This enables a space-saving embodiment of the end station facility to be achieved. The formulation that "one of the two object stores is placed at least partly below the sorter" is to be understood in the present case as the object store concerned, viewed from above, being covered at least partly by the sorter.

In a preferred form of embodiment of the invention the transport facility is configured to transport the objects to be transported to the first object store, in a first direction of transport, to the first object store and to transport the objects to be transported to the second object store, in a second direction of transport, to the second object store. Preferably the first and the second direction of transport are different from one another. In particular the second direction of transport can be a direction opposite to the first direction of transport.

The first direction of transport can in particular be the same or essentially the same as the object introduction direction, in which the objects are brought from the sorter into the end station facility. In the sense of the present invention the first direction of transport and the object introduction direction are to be understood as "essentially the same", if these two directions are not exactly the same, the degree of the angle between these two directions amounting to at most 20°, however.

The local direction of object conveyance of the sorter in the area of the sorter adjoining the end station facility can for example be at right angles to the object introduction direction. Such an orientation of the object introduction direction (in relation to the local direction of object conveyance) is able to be realized favorably in terms of outlay by a corresponding mechanical design of the sorter.

The sorter can be embodied as a tilt tray sorter or as a transverse belt sorter for example.

The transport facility of the end station facility can comprise a non-driven gravitational conveyor, in particular a roller track or a chute. A non-driven gravitational conveyor is to be understood in the present case as a conveyor facility that can convey and object solely by the force of gravity without using a drive facility.

As an alternative or in addition to the non-driven gravitational conveyor, the transport facility can comprise a conveyor facility equipped with a conveyor drive, such as for example a band conveyor (also called a belt conveyor) or a roller conveyor.

Advantageously the said conveyor drive is a reversible drive, i.e. a drive with a reversible drive direction. Such a drive makes it possible to transport an object located on the transport facility—depending on the direction of drive—in a first direction or in a second direction.

In an advantageous embodiment of the invention the transport facility has a conveyor table supported in a translationally height-adjustable manner. In this case it is advantageous for the transport facility also to have a lifting mechanism for raising and lowering the conveyor table. The lifting mechanism can comprise a linear drive for example, in particular a lifting cylinder.

A translationally height-adjustable support of the conveyor table is to be understood here as a support in which the conveyor table can change its height position by a translation movement.

As an alternative or in addition to the conveyor table, the transport facility can have a conveyor flap supported pivotably about a pivot axis. In this case it is advantageous for the transport facility also to have a pivot mechanism for pivoting the conveyor flap. The pivot mechanism can contain a pivot bearing and a linear drive for example, in particular a lifting cylinder. Instead of the linear drive or in addition to the linear drive the pivot mechanism can have a pulling means connected to the conveyor flap (for example a cable or a chain), a pulley to guide the pulling means, a drum connected to the pulling means for winding and unwinding the pulling means and also a motor connected to the drum for driving the drum.

The conveyor flap expediently has two edges aligned at right angles to the object introduction direction. Preferably the pivot axis is aligned in parallel to these two edges and is arranged closer to that edge of these two edges that is furthest way from the sorter. In particular the pivot axis can be in the immediate vicinity of that edge of these two edges that is furthest way from the sorter (for example at a distance of at most 60 mm from this edge).

The gravitational conveyor of the transport facility previously mentioned can be a component of the conveyor table or of the conveyor flap. In the same way the conveyor facility of the transport facility previously mentioned (equipped with a conveyor drive) can be a component of the conveyor table or of the conveyor flap.

Preferably the first and the second object store can be at a distance from one another. In particular the two object stores can be arranged on opposing sides of the transport facility.

At least one of the two object stores can be embodied as a retrieval table. The objects located in such an object store can be manually reloaded into a rolling container for the purposes of transporting them away.

In an advantageous embodiment variant of the invention at least one of the two object stores is embodied as a rolling container. In this case it is advantageous for the transport facility to be configured to bring an object directly into the object store(s) embodied as a rolling container. In this way the effort of loading objects by hand into a rolling container for the purposes of transporting them away is done away with.

If one of the two object stores is embodied as a rolling container, then this object store can be used as storage for small objects for example, while the other of the two stores can be used as storage for large objects.

In a preferred manner the sorting installation, in particular its end station facility, is equipped with a control device for controlling the transport facility. The control device is preferably then configured to control, as a function of one or more parameters of the respective object brought into the end station facility, which of the two object stores the respective object is to be transported by the transport facility. The parameters of the respective object can involve its destination address, its dimensions and/or its weight for example.

To detect the parameter or the parameters the end station facility advantageously has one or more sensors. Expediently the control device is connected for signaling to the sensor or the sensors.

The end station facility can further have a conveyor unit upstream of the transport facility for conveying objects brought into the end station facility to the transport facility. This conveyor unit can contain a non-driven gravitational conveyor for example, in particular a roller track or a chute. As an alternative or in addition to the non-driven gravitational conveyor, this transport facility can comprise a conveyor facility equipped with a conveyor drive, such as for example a belt conveyor or a roller conveyor.

The end station facility can comprise precisely two object stores, namely the first object store previously mentioned and the second object store previously mentioned. As an alternative the end station facility can comprise one or more further object stores in addition to the two object stores mentioned previously. In the latter case the transport facility of the end station facility can be configured to transport the objects brought by the sorter into the end station facility along a further transport path to such a further object store.

The sorting installation can be an element of a parcel-handling or dispatch center for example. The aforesaid end station facility can in particular involve what is known as a local end station (also called a B end station). The aforementioned sorter is preferably what is referred to as a main sorter.

Furthermore the sorting installation can have a plurality of end station facilities of the type described previously. All or a few of these end station facilities can be arranged in a row next to one another, in particular adjoining one another. The sorting installation can further have one of more end station facilities of a different type.

In addition to the sorter previously mentioned, the sorting installation can have one or more further sorters. In particular the sorting installation can comprise a number of different types of sorter, such as for example one or more main sorters as well as one or more pre-sorters.

As mentioned at the outset, the invention relates inter alia to a method for the sorting of objects in a sorting installation.

In the inventive method objects are conveyed on a sorter of the sorting installation and at least a few of the objects conveyed on the sorter are brought by the sorter in an object introduction direction into an end station facility of the sorting installation, wherein the object introduction direction is different from a local direction of object conveyance of the sorter in an area of the sorter adjoining the end station facility. Further, in the inventive method, the objects brought by the sorter into the end station facility are transported with the aid of a transport facility of the end station facility optionally along a first transport path to a first object store of the end station facility or along a second transport path to a second object store of the end station facility in each case.

Forms of embodiment, embodiment details and advantages described above in conjunction with the inventive sorting installation can also relate to the inventive method. The sorting installation described in conjunction with the inventive method can further in particular be the inventive sorting installation described further above.

In a preferred form of embodiment of the invention those objects that are transported by the transport facility to the first object store are transported in a first direction of transport to the first object store, and those objects that are transported by the transport facility to the second object store can be transported in a second direction of transport to the second object store. Preferably the first direction of transport is different from the second direction of transport.

Advantageously the transport facility is controlled by a control device. The control device controls for example, as a function of one or more parameters of the respective object brought into the end station facility, to which of the two object stores the respective object is to be transported by means of the transport facility.

The description of preferred embodiments of the invention given above contains numerous features, which are partially reproduced grouped together into a number of features in the individual dependent claims. These features can however also be considered on their own and grouped together into sensible further combinations. In particular these features are able to be combined individually in each case and in any suitable combination with the inventive method and the inventive sorting installation. Method features can further also be seen as a characteristic of the corresponding facility unit.

Other features which are considered as characteristic for the invention are set forth in the appended claims.

Although the invention is illustrated and described herein as embodied in a sorting installation and a method for the sorting of objects, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 9-11 are illustrations showing a third exemplary embodiment of an inventive sorting installation in different states; and FIG. 12 is an illustration showing a fourth exemplary embodiment of an inventive sorting installation.

DETAILED DESCRIPTION OF THE INVENTION

Figure 1:
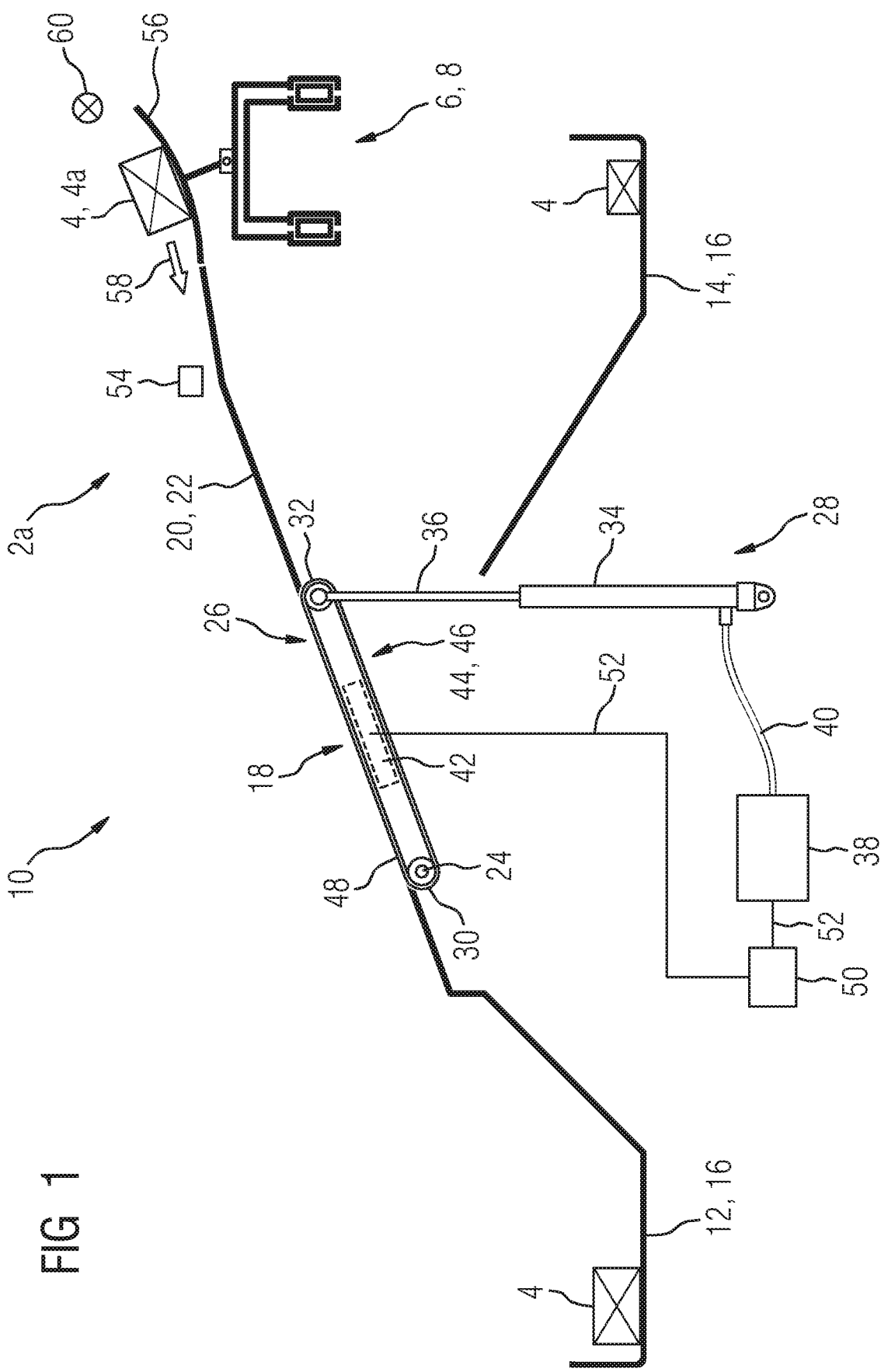
FIGS. 1-4 are illustrations showing a first exemplary embodiment of a sorting installation in different states according to the invention.

Referring now to the figures of the drawings in detail and first, particularly to FIG. 1 thereof, there is shown a schematic of a first sorting installation 2a for the sorting of objects 4, such as parcels for example.

The sorting installation 2a contains a sorter 6 for conveying objects 4, which is embodied in the present case by way of example as a tilt tray sorter 8. The sorting installation 2a further has an end station facility 10. The sorter 6 is configured to bring at least a few of the objects 4 conveyed on the sorter 6 into the end station facility 10.

In addition to the end station facility 10 depicted, the sorting installation 2a can contain one or more further end station facilities and where necessary one or more further sorters. For the sake of simplicity any further end station facilities and any further sorters of the sorting installation 2a are not discussed below.

The end station facility 10 of the sorting installation 2a contains a first object store 12 for (intermediate) storage of objects 4 and a second object store 14 for (intermediate) storage of objects 4. In the present exemplary embodiment both object stores 12, 14 are embodied as retrieval tables 16, wherein basically other forms of embodiment of the object stores 12, 14 are possible. As can be seen from FIG. 1, the second object store 14 is positioned partly under the sorter 6.

Furthermore the end station facility 10 has a transport facility 18, which is configured to transport the objects 4 brought by the sorter 6 into the end station facility 10 in each case optionally along a first transport path to the first object store 12 or along a second transport path to the second object store 14.

Between the transport facility 18 and the sorter 6 the end station facility 10 has a conveyor unit 20 for conveying objects 4 brought into the end station facility 10 to the transport facility 18. In the present exemplary embodiment the conveyor unit 20 is embodied as a chute 22. As an alternative the conveyor unit 20 can be embodied for example as a non-driven roller track (cf. sorting installation 2b in FIG. 5) or as a conveyor facility with a conveyor drive.

The transport facility 18 has a conveyor flap 26 pivotably supported about a pivot axis 24 as well as a pivot mechanism 28 for pivoting the conveyor flap 26. The conveyor flap 26 of the transport facility 18 has a first edge 30, which is aligned at right angles to the plane of the drawing in FIG. 1, as well as a second edge 32, which is aligned at right angles to the plane of the drawing in FIG. 1. The pivot axis 24, about which the conveyor flap 26 is able to be pivoted, is aligned in parallel to these two edges 30, 32 and is arranged on that edge of the two edges 30, 32, which is closer to the first object store 12.

The pivot mechanism 28 contains a pivot bearing not shown in the figure, to which the conveyor flap 26 is attached, as well as a pivotably supported lifting cylinder 34, on which the conveyor flap 26 is supported and which has the piston rod 36 that can be extended and retracted. In the present exemplary embodiment the lifting cylinder 34 is embodied as a fluid cylinder. This means that the position of the piston rod 36 of the lifting cylinder 34 is able to be controlled by means of a (control) fluid. To set the fluid pressure in its lifting cylinder 34 the respective pivot mechanism 28 has a fluid pump 38, which is connected by means of a fluid line 40 to the lifting cylinder 34.

The conveyor flap 26 of the transport facility 18 contains a conveyor facility 44 equipped with a reversible conveyor drive 42. In the present exemplary embodiment the conveyor facility 44 is embodied as a belt conveyor 46. This means that the conveyor facility 44 contains a conveyor belt 48, which is able to be driven by the conveyor drive 42. Basically other forms of embodiment of the conveyor facility 44 are also possible. For example the conveyor facility 44 can be embodied as a roller conveyor with driven rollers. The conveyor drive 42 involves an electric drive in the present case.

The sorting installation 2a is further equipped with a control device 50 for controlling the transport facility 18, which is connected by a control line 52 to the fluid pump 38 and the conveyor drive 42 of the conveyor flap 26 respectively. As an alternative there can be provision for the control device 50 to control the conveyor drive 42 and/or the fluid pump 38 via radio signals.

The control device 50 is configured by software, which is implemented in the control device 50, to control as a function of a parameter of the object 4 brought into the end station facility 10, to which of the two object stores 12, 14 the respective object 4 is to be transported by means of the transport facility 18. The parameter can be the size of the respective object 4 for example.

To detect the parameter of the respective object 4 the end station facility 10 has a sensor 54. This can involve an optical sensor for example. The sensor 54 is connected to the control device 50 for signaling, for example via a control line not shown in the figure. When the sorting installation 2a is operating, the sensor 54 detects the parameter of the respective object 4 brought into the end station facility 10 and transfers the detected parameter to the control device 50.

In FIG. 1 the sorting installation 2a is shown in a state in which an object 4a is located on the sorter 6 and the conveyor flap 26 in is in its upper position. In this state the nearer edge 32 of the conveyor flap 26 of the sorter 6 of the two edges 30, 32 previously mentioned is at the same height as the lower end of the conveyor unit 20 arranged between the transport facility 18 and the sorter 6.

The object 4a is brought into the end station facility 10, starting from this state, by a tilt tray 56 of the sorter 6 in an object introduction direction 58, which is at right angles to the local direction of object conveyance 60 of the sorter 6 in the area of the sorter 6 adjoining the end station facility 10. The local direction of object conveyance 60 of the sorter 6 in the area of the sorter 6 adjoining the end station facility 10 is at right angles to the plane of the drawing in FIG. 1. The object 4a arrives on the transport facility 18 via the conveyor unit 20 arranged between the sorter 6 and the transport facility 18.

Figure 2:
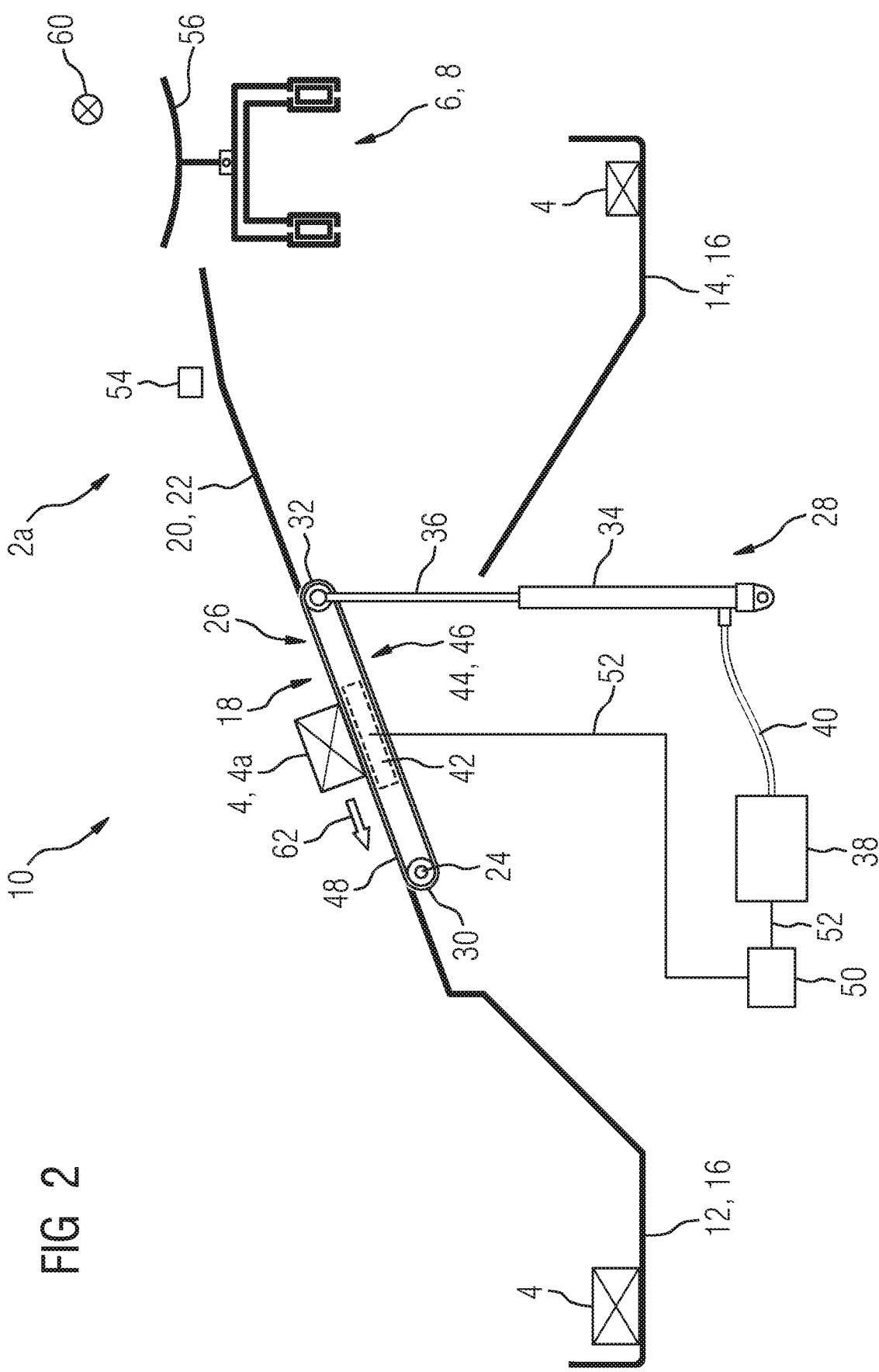

FIG. 2 shows the sorting installation 2a in another state. In FIG. 2 the object 4a, which was previously located on the sorter 6 (cf. FIG. 1), is now located on the pivotably supported conveyor flap 26 of the transport facility 18.

If the object 4a is to be brought into the first object store 12, the conveyor flap 26 will be left in its upper position. In this case the conveyor drive 42 of the conveyor facility 44 is controlled by the control device 50 so that the conveyor facility 44 transports the object 4a in a first direction of transport 62, which is essentially the same as the object introduction direction 58 (cf. FIG. 1), to the first object store 12.

Figure 3:
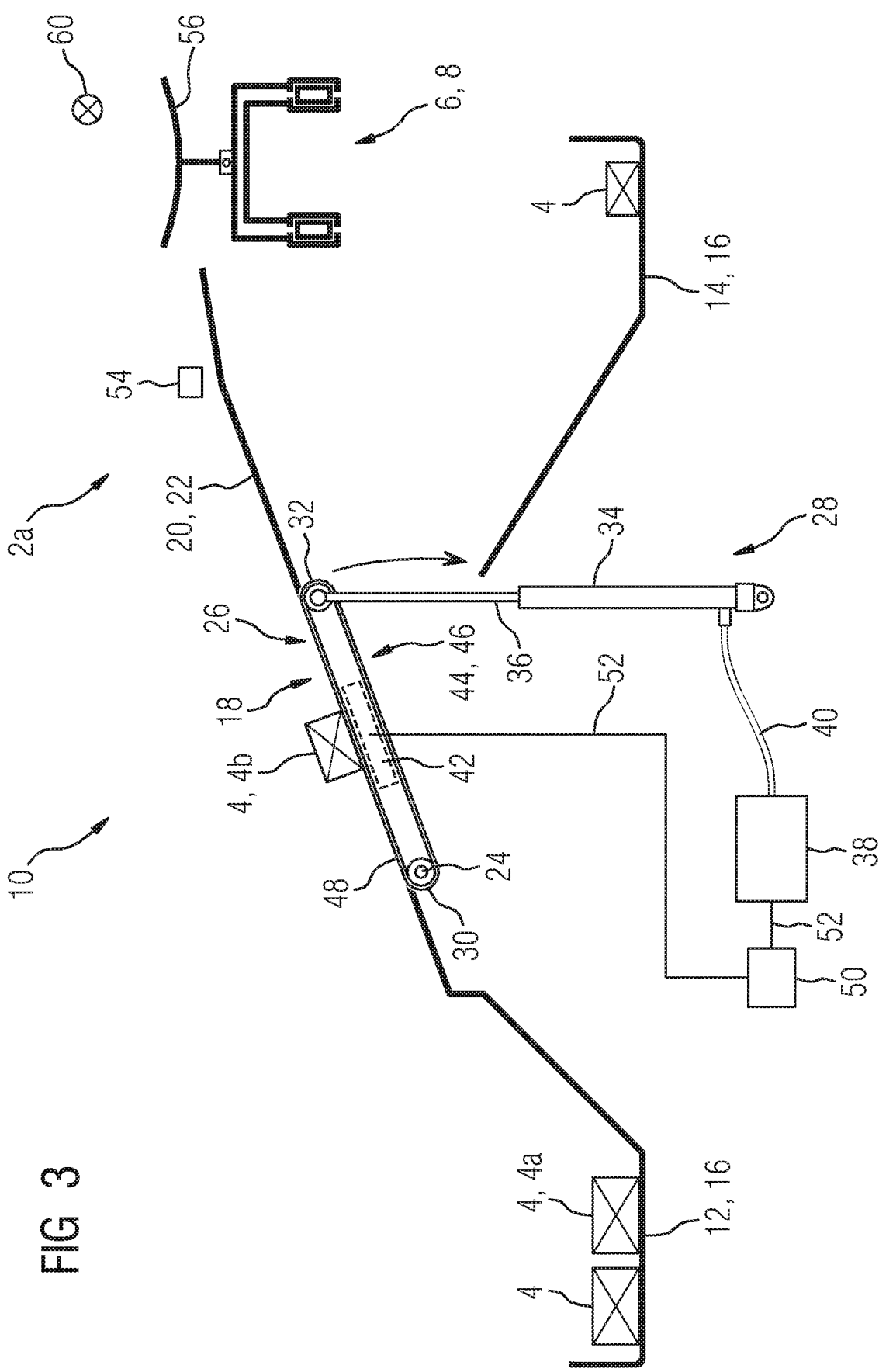

FIG. 3 shows the sorting installation 2a in a further state. In FIG. 3 the object 4a, which was previously located on the conveyor flap 26 (cf. FIG. 2), is now located in the first object store 12, while a further object 4b is located on the conveyor flap 26, which has been brought by the sorter 6 into the end station facility 10.

Figure 4:
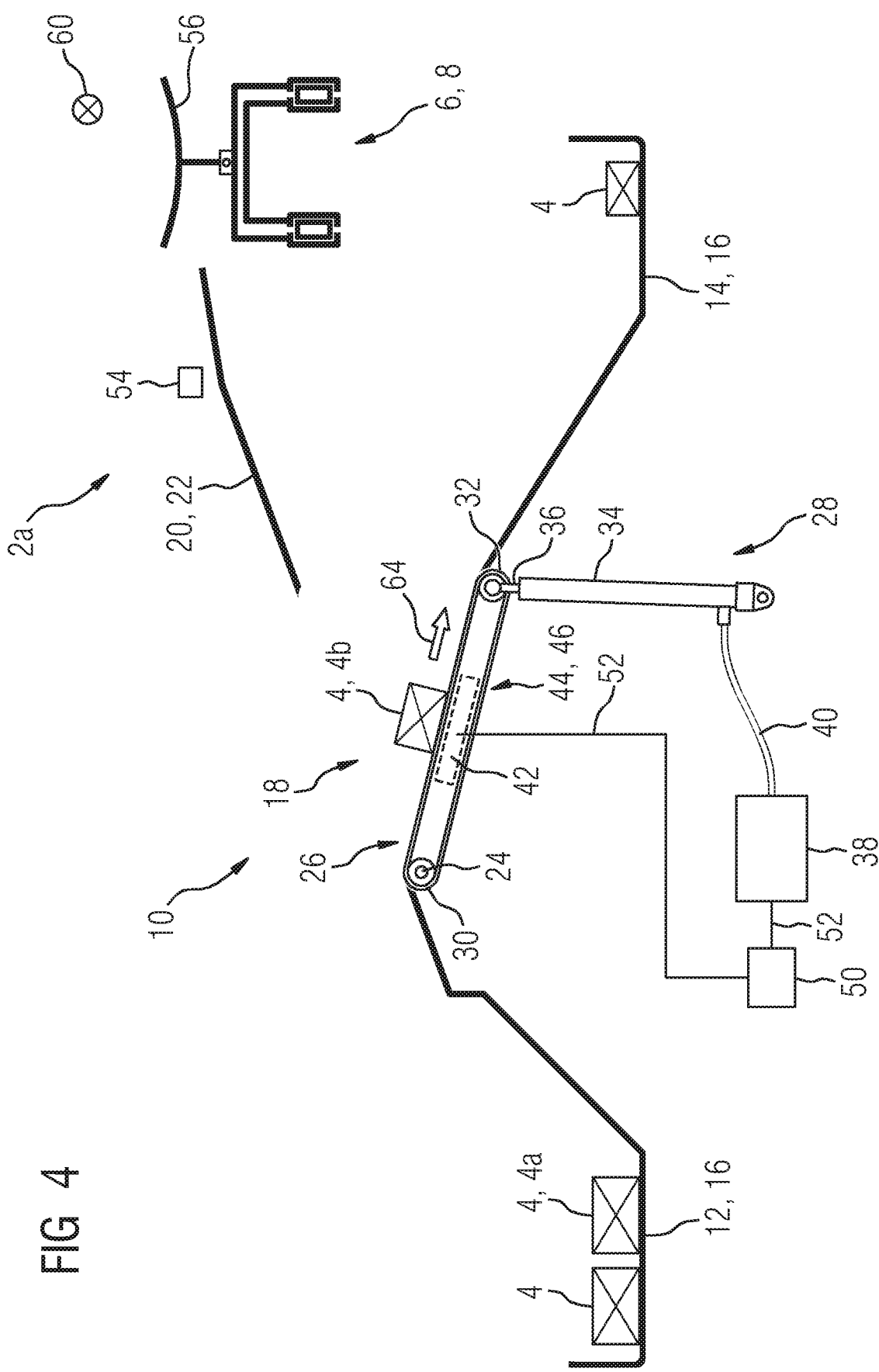

If the last-mentioned object 4b is to be brought into the second object store 14, the conveyor flap 26 is pivoted about the pivot axis 24 into the lower position of the conveyor flap 26 (cf. FIG. 4). Here the control device 50 controls the fluid pump 38 in such a way that the fluid pump 38 changes the fluid pressure in the lifting cylinder 34 so that the piston rod 36 of the lifting cylinder 34 is retracted.

FIG. 4 shows the sorting installation 2a once again in another state. In FIG. 4 the conveyor flap 26 is in its lower position, wherein the last-mentioned object 4b is still located on the conveyor flap 26.

In this state the control device 50 controls the conveyor drive 42 of the conveyor facility 44 in such a way that the conveyor facility 44 transports the last-mentioned object 4b in a second direction of transport 64, which is different from the first direction of transport 62 (cf. FIG. 2), to the second object store 14.

The descriptions of the subsequent exemplary embodiments are each restricted primarily to the differences from the preceding exemplary embodiment, to which the reader is referred in relation to features and functions that are the same. The same elements and/or those that correspond to one another, where this serves a useful purpose, are identified with the same reference numbers. Features of the previous exemplary embodiment are included in the exemplary embodiment below without them being described once again.

Figure 5:
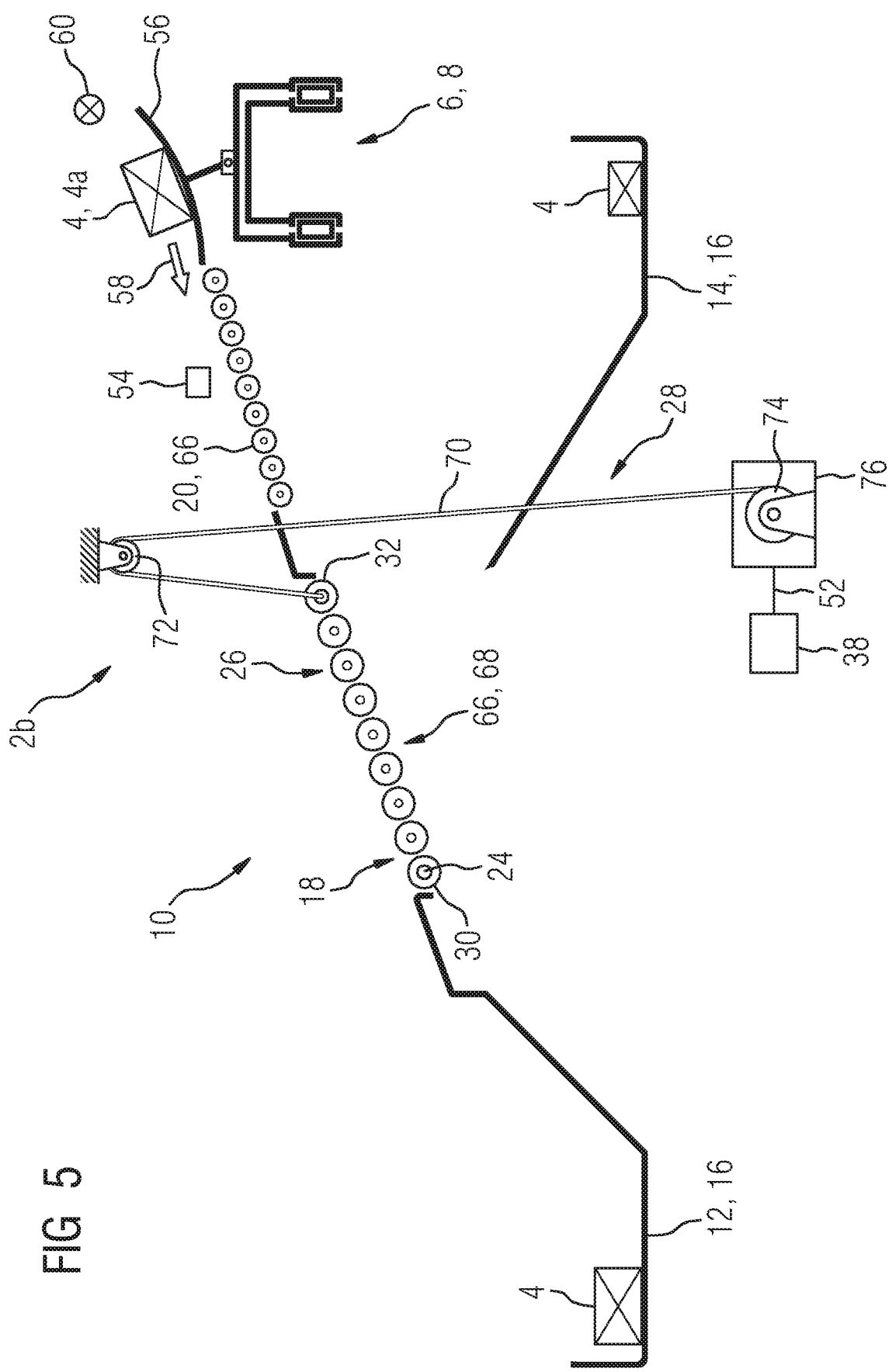
FIGS. 5-8 are illustrations showing a second exemplary embodiment of an inventive sorting installation in different states.

FIG. 5 shows a schematic of a second sorting installation 2b with the sorter 6 and the end station facility 10.

In this sorting installation 2b the conveyor unit 20 arranged between the transport facility 18 of the end station facility 10 and the sorter 6 is embodied as a non-driven roller track 66. As an alternative the conveyor unit 20 can be embodied as a roller conveyor with a conveyor drive or (as in the first sorting installation 2a) as a chute.

In the second sorting installation 2b the conveyor flap 26 of the transport facility 18 further contains (instead of a conveyor facility with a conveyor drive) a non-driven gravitational conveyor 68 by way of example, which in the present case is embodied as a roller track 66.

Furthermore the pivot mechanism 28 in the second sorting installation 2b (instead of a lifting cylinder and a fluid pump) contains a pulling device 70 (for example a cable) connected to the conveyor flap 26, a pulley 72 for guiding the pulling device 70, a drum 74 connected to the pulling device 70 for winding and unwinding the pulling device 70 as well as a motor 76 connected to the drum 74 for driving the drum 74.

In the present exemplary embodiment the motor 76 of the pivot mechanism 28 is an electric motor. The motor 76 is connected via a control line 52 to the control device 50 and is controlled by the control device 50.

In FIG. 5 the second sorting installation 2b is shown in a state in which an object 4a is located on the sorter 6 and the conveyor flap 26 is in its upper position.

Starting from this state, the object 4a is brought by means of the tilt tray 56 of the sorter 6 in an object introduction direction 58, which is at right angles to the local direction of object conveyance 60 of the sorter 6 in the area of the sorter 6 adjoining the end station facility 10, into the end station facility 10. The object 4a reaches the transport facility 18 via the conveyor unit 20 arranged between the sorter 6 and the transport facility 18.

Figure 6:
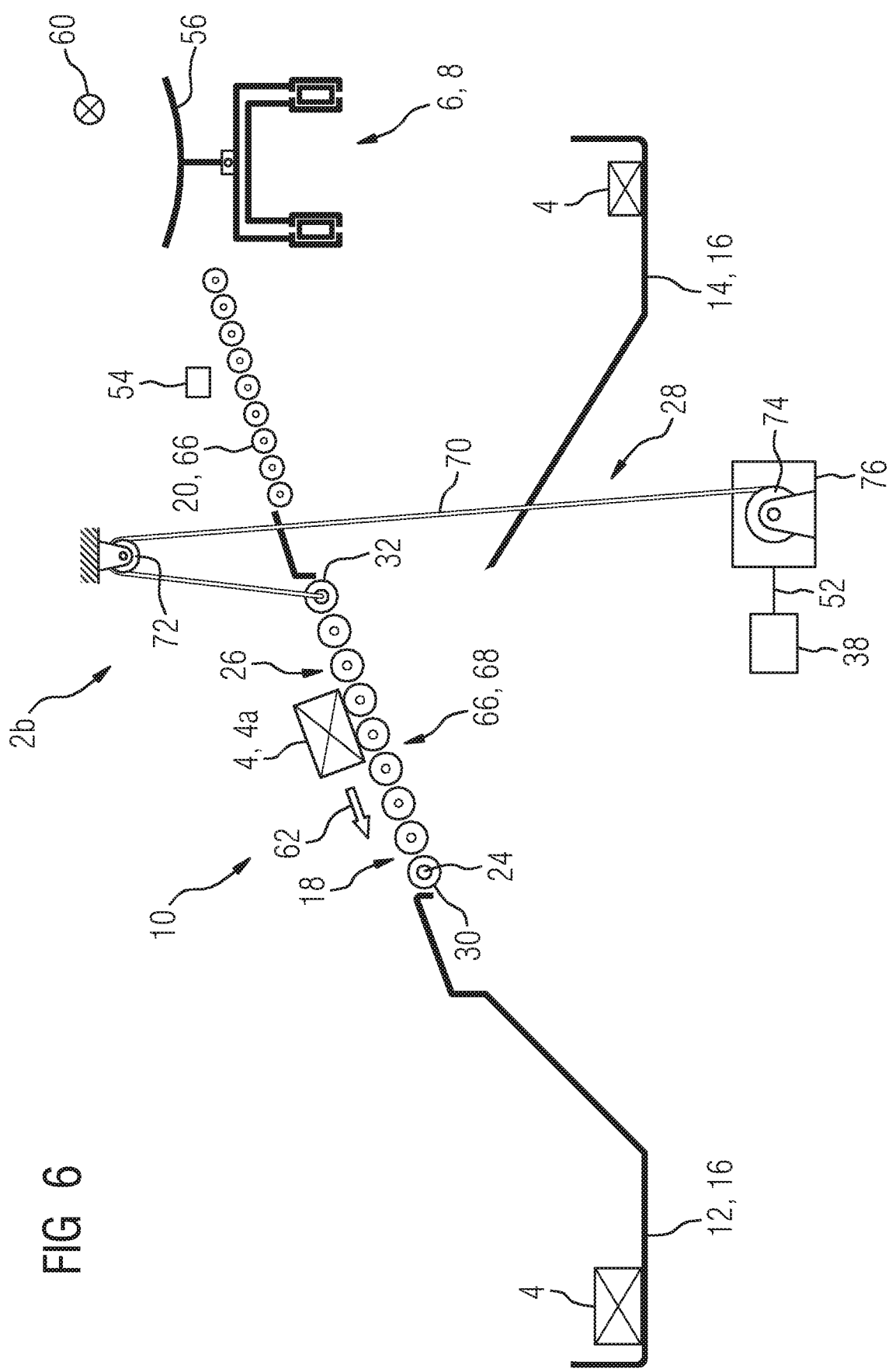

FIG. 6 shows the second sorting installation 2b in another state. In FIG. 6 the object 4a, which was previously located on the sorter 6 (cf. FIG. 5), is now on the pivotably supported conveyor flap 26 of the transport facility 18.

If the object 4a is to be brought into the first object store 12, the conveyor flap 26 is left in its upper position, so that the object 4a is transported by the conveyor facility 44 of the conveyor flap 26 under the influence of gravity in a first direction of transport 62, which is essentially the same as the object introduction direction 58 (cf. FIG. 5), to the first object store 12.

Figure 7:
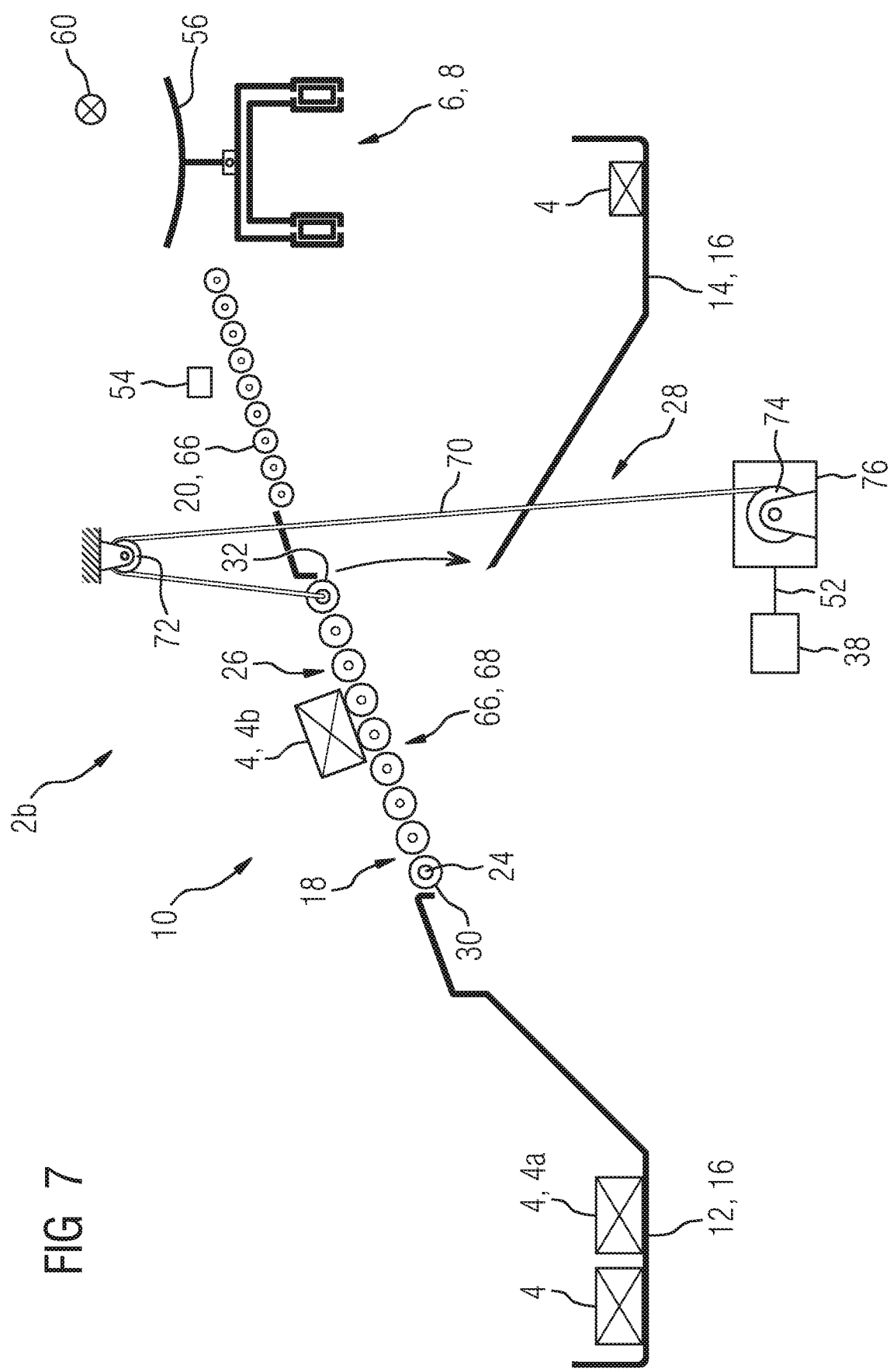

FIG. 7 shows the second sorting installation 2b in a further state. In FIG. 7 the object 4a, which was previously located on the conveyor flap 26 (cf. FIG. 6), is now in the first object store 12, while a further object 4b is located on the conveyor flap 26, which has been brought by the sorter 6 into the end station facility 10.

Figure 8:
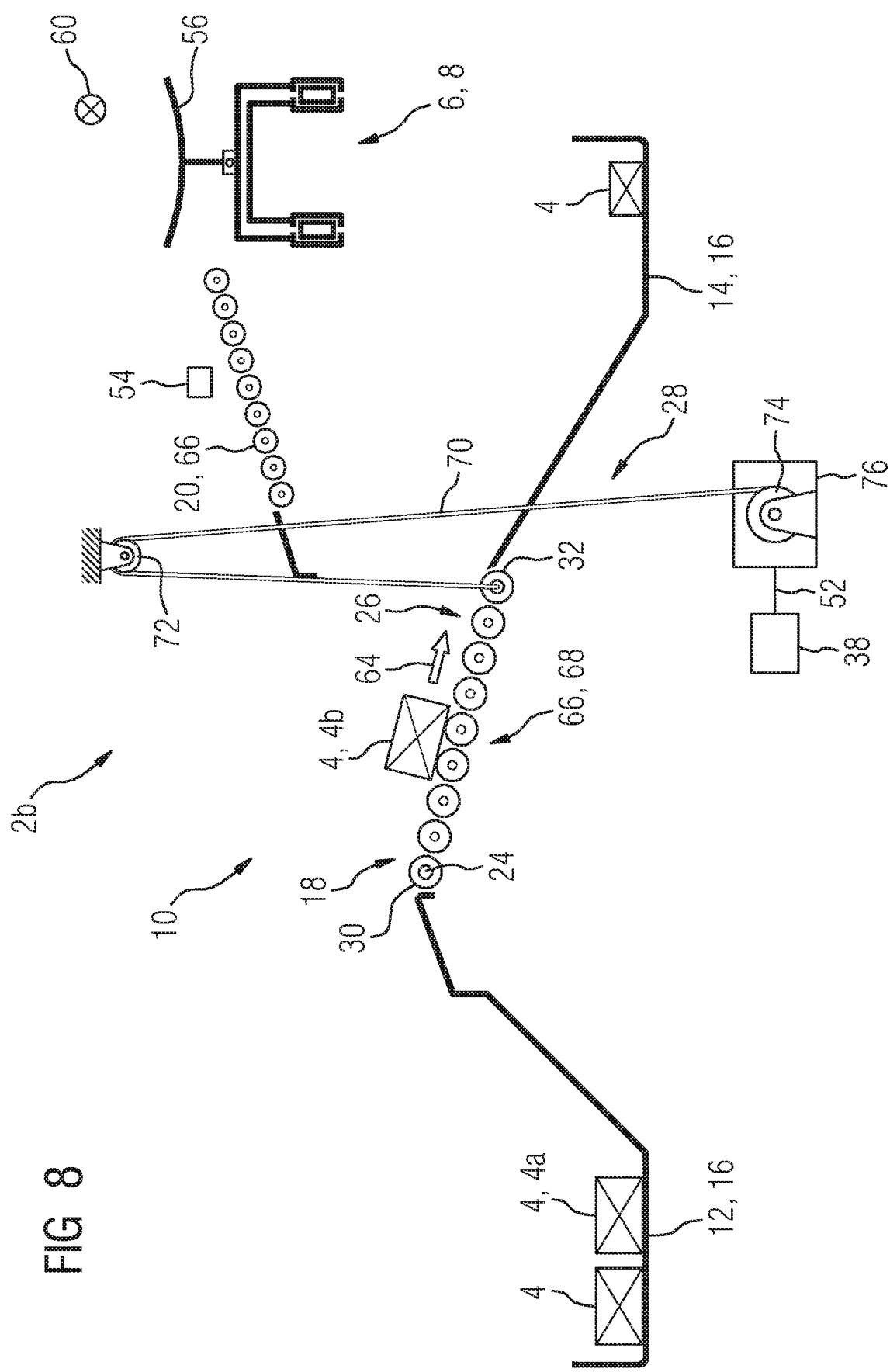

If the last-mentioned object 4b is to be brought into the second object store 14, the conveyor flap 26 is pivoted about the pivot axis 24 into the lower position of the conveyor flap 26 (cf. FIG. 8). Here the control device 50 controls the motor 76 in such a way that the motor 76 drives the drum 74 so that a section of the pulling device 70 is unwound from the drum 74.

FIG. 8 shows the second sorting installation 2b once again in another state. In FIG. 8 the conveyor flap 26 is in its lower position, wherein the last-mentioned object 4b is still located on the conveyor flap 26.

In this state the last-mentioned object 4b is transported by the conveyor facility 44 of the conveyor flap 26 under the influence of gravity in a second direction of transport 64, which is different from the first direction of transport 62 (cf. FIG. 6), to the second object store 14.

FIG. 9 shows a schematic of a third sorting installation 2c with the sorter 6 and the end station facility 10.

In the sorting installation 2c the transport facility 18 of the end station facility 10 (instead of a conveyor flap and a pivot mechanism) has a conveyor table 78 supported in a translationally height-adjustable manner as well as a lifting mechanism 80 for raising and lowering the conveyor table 78.

The conveyor table 78 contains a conveyor facility 44 equipped with a reversible conveyor drive 42. In the present exemplary embodiment the conveyor facility 44 is embodied as a belt conveyor 46.

Furthermore the lifting mechanism 80 of the transport facility 18 contains a number of (not pivotably supported) lifting cylinders 34, on which the conveyor table 78 is supported. In FIG. 9 the piston rods 36 of the lifting cylinders 34 are extended far enough for the conveyor table 78 to be located in its highest position (i.e. at the same height as the lower end of the conveyor unit 20 arranged between the transport facility 18 and the sorter 6).

In the present exemplary embodiment the first object store 12 is embodied as a retrieval table 16, while the second object store 14 is embodied as a rolling container 82. With the aid of a retaining facility not shown in the figures the second object store 14 embodied as a rolling container 82 can be brought into an angled position and fixed in this position, so that an object 4 can be brought by the transport facility 18 directly into the second object store 14.

The first object store 12 can be embodied as a rolling container instead of the second object store 14. In this case the second object store 14 can be embodied as a retrieval table for example. Furthermore it is basically possible to embody both object stores 12, 14 as rolling containers. In the preceding embodiments too at least one of the two object stores 12, 14 can be embodied as a rolling container.

In FIG. 9 the third sorting installation 2c is shown in a state in which an object 4a is located on the sorter 6.

Starting from this state, the object 4a is brought by the tilt tray 56 of the sorter 6 in an object introduction direction 58, which is at right angles to the local direction of object conveyance 60 of the sorter 6 in the area of the sorter 6 adjoining the end station facility 10, into the end station facility 10. The object 4a reaches the transport facility 18 via the conveyor unit 20 arranged between the sorter 6 and the transport facility 18.

FIG. 10 shows the third sorting installation 2c in another state. In FIG. 10 the object 4a, which was previously located on the sorter 6 (cf. FIG. 9), is now located on the conveyor table 78 of the transport facility 18.

Starting from this state, the conveyor table 78 is lowered with the aid of the lifting mechanism 80 of the transport facility 18. Here the control device 50 controls the fluid pump 38 connected to the lifting cylinders 34 in such a way that the fluid pump 38 changes the fluid pressure in the lifting cylinders 34 so that the piston rods 36 of the lifting cylinders 34 are retracted.

FIG. 11 shows the third sorting installation 2c in a state in which the conveyor table 78 is in its lowest position.

Starting from this state, the object 4a, which is located on the conveyor table 78, is transported as a function of an object parameter, such as for example the size of the object 4a, by the conveyor facility 44 of the conveyor table 78 optionally in a first horizontal direction of transport 62 to the first object store 12 or in a second horizontal direction of transport 64, which runs in the opposite direction to the first transport facility 18, to the second object store 14. Here the conveyor drive 42 of the conveyor facility 44 is controlled by the control device 50 in such a way that the conveyor facility 44 conveys the said object 4a in the first direction of transport 62 or in the second direction of transport 64.

FIG. 12 shows a schematic of a fourth sorting installation 2d with a sorter 6 and an end station facility 10.

The sorting installation 2d essentially corresponds to the third sorting installation 2c (see FIG. 9 to FIG. 11), but the sorter 6 of this sorting installation 2d is not embodied as a tilt tray sorter, but as a transverse belt sorter 84 however. In this sorting installation 2d objects 4 are brought by the sorter 6 into the end station facility 10 in a horizontal object introduction direction 58.

An object 4 is transported by the transport facility 18, which has a conveyor table 78 supported in a translationally height-adjustable manner as well as a lifting mechanism 80 for raising and lowering the conveyor table 78 as in the preceding exemplary embodiment, in the same way as in the preceding exemplary embodiment to the respective object store 12, 14 of the end station facility 10.

Although the invention has been illustrated and described in greater detail by the preferred exemplary embodiment, the invention is not restricted by the examples disclosed and other variations can be derived herefrom without departing from the scope of protection of the invention.

The following is a summary list of reference numerals and the corresponding structure used in the above description of the invention:

2a Sorting installation
2b Sorting installation
2c Sorting installation
2d Sorting installation
4 Object
4a Object
4b Object
6 Sorter
8 Tilt tray sorter
10 End station facility
12 Object store
14 Object store
16 Retrieval table
18 Transport facility
20 Conveyor unit
22 Chute
24 Pivot axis
26 Conveyor flap
28 Pivot mechanism
30 Edge
32 Edge
34 Lifting cylinder
36 Piston rod
38 Fluid pump
40 Fluid line
42 Conveyor drive
44 Conveyor facility
46 Belt conveyor
48 Conveyor belt
50 Control device
52 Control line
54 Sensor
56 Tilt tray
58 Object introduction direction
60 Direction of object conveyance
62 Direction of transport
64 Direction of transport
66 Roller track
68 Gravitational conveyor
70 Pulling means
72 Pulley
74 Drum
76 Motor
78 Conveyor table
80 Lifting mechanism
82 Rolling container
84 Transverse belt sorter

The invention claimed is:

1. A sorting installation for sorting objects, the sorting installation comprising:
a sorter for conveying the objects;
an end station facility for accepting the objects, wherein said sorter is configured to bring at least a few of the objects conveyed on said sorter in an object introduction direction, being different from a local direction of object conveyance of said sorter in an area of said sorter adjoining said end station facility, into said end station facility; and
said end station facility having a first object store, a second object store and a transport facility, said transport facility configured to transport the objects brought into said end station facility by said sorter optionally along a first transport path to said first object store or along a second transport path to said second object store in each case;
wherein said transport facility has a conveyor flap that has two edges, and wherein the pivot axis is aligned at a right angle to the object introduction direction and is disposed closer to that edge of said two edges that is at a greater distance from said sorter.

2. The sorting installation according to claim 1, wherein said transport facility is configured to transport the objects to be transported to said first object store, in a first direction of transport, to said first object store, and the objects to be transported to said second object store, in a second direction of transport different from the first direction of transport, to said second object store.

3. The sorting installation according to claim 2, wherein the first direction of transport is a same or is essentially a same as the object introduction direction.

4. The sorting installation according to claim 1, wherein the local direction of object conveyance of said sorter in said area of said sorter adjoining said end station facility is at right angles to the object introduction direction.

5. The sorting installation according to claim 1, wherein said sorter is embodied as a tilt tray sorter or as a transverse belt sorter.

6. The sorting installation according to claim 1, wherein said transport facility contains a non-driven gravitational conveyor.

7. The sorting installation according to claim 6, wherein said non-driven gravitational conveyor is a roller track or a chute.

8. The sorting installation according to claim 1, wherein said transport facility contains a conveyor facility equipped with a conveyor drive, wherein said conveyor drive is a reversible drive.

9. The sorting installation according to claim 8, wherein said conveyor drive is a belt conveyor or a roller conveyor.

10. The sorting installation according to claim 1, wherein said transport facility has a conveyor table supported in a translationally height-adjustable manner as well as a lifting mechanism for raising and lowering said conveyor table.

11. The sorting installation according to claim 1, wherein said conveyor flap is supported pivotably about a pivot axis and said transport facility has a pivot mechanism for pivoting said conveyor flap.

12. The sorting installation according to claim 11, wherein said two edges of said conveyor flap are aligned at right angles to the object introduction direction, wherein the pivot axis is aligned in parallel to said two edges.

13. The sorting installation according to claim 1, wherein:
at least one of said first and second object stores is embodied as a rolling container; and
said transport facility is configured to bring an object directly into said at least one object store embodied as said rolling container.

14. The sorting installation according to claim 1, further comprising a control device for controlling said transport facility, which is configured, in dependence on at least one parameter of a respective object brought into said end station facility, to control to which of said first and second object stores the respective object is to be transported by means of said transport facility.

15. A method for sorting of objects in a sorting installation, which comprises the steps of:

conveying the objects on a sorter of the sorting installation and at least a few of the objects conveyed on the sorter are brought by the sorter in an object introduction direction into an end station facility of the sorting installation, wherein the object introduction direction is laterally changed with respect to a local direction of object conveyance of the sorter in an area of the sorter adjoining the end station facility; and transporting the objects brought by the sorter into the end station facility with aid of a transport facility of the end station facility optionally along a first transport path to a first object store of the end station facility or along a second transport path to a second object store of the end station facility in each case;

wherein the objects, which are transported by the transport facility to the first object store are transported in a first direction of transport to the first object store, and the objects, which are transported by the transport facility to the second object store are transported in a second direction of transport to the second object store, wherein the first direction of transport is different from the second direction of transport;

wherein the second direction of transport is a direction opposite the first direction of transport; and wherein an object store selected from the group consisting of the first object store and the second object store is at least partly covered by the sorter when viewed from above.

16. The method according to claim 15, which further comprises controlling the transport facility by a control device, wherein the control device controls, in dependence on at least one parameter of a respective object brought into the end station facility, to which of the first and second object stores the respective object is transported by means of the transport facility.

17. A sorting installation for sorting objects, the sorting installation comprising:

a sorter for conveying the objects; and an end station facility for accepting the objects, wherein said sorter is configured to bring at least a few of the objects conveyed on said sorter in an object introduction direction, being laterally changed with respect to a local direction of object conveyance of said sorter in an area of said sorter adjoining said end station facility, into said end station facility;

said end station facility having a first object store, a second object store and a transport facility, said transport facility configured to transport the objects brought into said end station facility by said sorter optionally along a first transport path to said first object store or along a second transport path to said second object store in each case;

wherein said transport facility is configured to transport the objects to be transported to said first object store, in a first direction of transport, to said first object store, and the objects to be transported to said second object store, in a second direction of transport different from the first direction of transport, to said second object store; and wherein the second direction of transport is a direction opposite the first direction of transport; and wherein an object store selected from the group consisting of said first object store and said second object store is at least partly covered by said sorter when viewed from above.

* * * * *